(12) United States Patent
Pan et al.

(10) Patent No.: US 9,897,722 B2
(45) Date of Patent: Feb. 20, 2018

(54) OPTICALLY DIFFUSIVE PLASTIC HAVING HIGH STIFFNESS

(71) Applicant: SABIC Global Technologies B. V., Bergen op Zoom (NL)

(72) Inventors: Shengping Pan, Shanghai (CN); Jian Yang, Shanghai (CN); Yu Ding, Shanghai (CN); Guangde Huang, Shanghai (CN); Narong An, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 141 days.

(21) Appl. No.: 14/849,773

(22) Filed: Sep. 10, 2015

(65) Prior Publication Data

US 2016/0070027 A1 Mar. 10, 2016

Related U.S. Application Data

(60) Provisional application No. 62/048,494, filed on Sep. 10, 2014.

(51) Int. Cl.
*G02B 5/02* (2006.01)
*G02B 1/04* (2006.01)

(52) U.S. Cl.
CPC .............. *G02B 1/04* (2013.01); *G02B 1/041* (2013.01); *G02B 5/02* (2013.01)

(58) Field of Classification Search
CPC .. G02B 3/0012; G02B 3/0031; G02B 5/0236; G02B 5/0242; G02B 1/04
See application file for complete search history.

(56) References Cited

U.S. PATENT DOCUMENTS

| | | | |
|---|---|---|---|
| 7,119,140 B2 | 10/2006 | Basham et al. | |
| 7,700,682 B2 | 4/2010 | Sekine | |
| 8,557,158 B2 | 10/2013 | Shen et al. | |
| 8,619,363 B1 | 12/2013 | Coleman | |
| 2008/0151372 A1 | 6/2008 | Ouderkirk et al. | |
| 2010/0076155 A1 | 3/2010 | Higashiyama et al. | |
| 2014/0071695 A1 | 3/2014 | Chen et al. | |
| 2014/0170397 A1 | 6/2014 | Shen et al. | |
| 2015/0011688 A1 | 1/2015 | An et al. | |

OTHER PUBLICATIONS

International Search Report for International Application No. PCT/IB2015/056945; International Filing Date: Sep. 10, 2015; dated Nov. 25, 2015; 5 Pages.
Written Opinion of the International Searching Authority for International Application No. PCT/IB2015/056945; International Filing Date: Sep. 10, 2015; dated Nov. 25, 2015; 5 Pages.

*Primary Examiner* — Mariceli Santiago
(74) *Attorney, Agent, or Firm* — Cantor Colburn LLP

(57) ABSTRACT

An optically diffusive plastic can comprise 40 to 94.9 mass % of a polymer resin matrix; 5 to 50 mass % of a glass filler; and 0.1 to 10 mass % of a light diffusing component; wherein the difference between refractive index of the polymer resin matrix and refractive index of the glass filler is less than or equal to 0.02; wherein a 1 millimeter (mm) thick sample of the optically diffusive plastic comprises a DLD value of greater than or equal to 1 degree (°) as measured by goniophotometry; wherein the 1 mm thick sample comprises a total transmittance of greater than or equal to 40% for incident light having a wavelength of 360 nanometers (nm) to 750 nm in air; and wherein a 3.2 mm thick sample of the optically diffusive plastic comprises a flexural modulus, measured at 23° C., of greater than or equal to 2,500 Megapascal (MPa).

20 Claims, 12 Drawing Sheets

OPTICALLY DIFFUSIVE PLASTIC HAVING HIGH STIFFNESS

CROSS REFERENCE TO RELATED APPLICATIONS

This application claims priority to U.S. Provisional Application No. 62/048,494, filed Sep. 10, 2014, the contents of which are hereby incorporated by reference.

BACKGROUND

Optical diffusers and optical lenses can be used in various applications to disperse light emitted from a light source across an area to evenly light an object. A measure of an article's ability to act as a diffuser can be the Degree of Light Dispersion (DLD) value which measures the difference between the coherent transmission and the diffusive transmission of light passing through the article at a fixed transmittance. These diffusers and lenses can be used in a wide variety of applications including mobile phones, computer monitors, televisions and other display screens, light bulbs, and any lighting device where light dispersion is desired.

Optical diffusers and lenses can be made of glass which can include colorants and/or surface treatments to improve their diffusive effect. Glass diffusers and lenses can offer good stiffness, and good optical diffusivity, but poor impact resistance. Even thin wall diffusers and lenses made of glass can be heavy in comparison to equivalently sized plastic articles. Using engineered plastics (EP), e.g., polycarbonate (PC) and poly(methyl methacrylate) (PMMA), to make diffusers and lenses can reduce their weight. However, these plastics can have other drawbacks. For example, PC can have poor stiffness and PMMA can have poor stiffness and low impact resistance.

Thus there remains a need for optically diffusive plastics that can be formed into thin wall optical diffusers and/or optical lenses which can have high stiffness, impact strength, and a high degree of light dispersion (DLD) value while at low weight in comparison to glass and other engineered plastics.

BRIEF DESCRIPTION

Disclosed herein are optically diffusive plastics and articles made therefrom.

In an embodiment, an optically diffusive plastic can comprise: 40 to 94.9 mass % of a polymer resin matrix; 5 to 50 mass % of a glass filler; and 0.1 to 10 mass % of a light diffusing component; wherein the difference between refractive index of the polymer resin matrix and refractive index of the glass filler is less than or equal to 0.02; wherein a 1 millimeter (mm) thick sample of the optically diffusive plastic comprises a Degree of Light Dispersion (DLD) value of greater than or equal to 1 degree (°) as measured by goniophotometry; wherein the 1 mm thick sample comprises a total transmittance of greater than or equal to 40% for incident light having a wavelength of 360 nanometers (nm) to 750 nm in air as determined by ASTM D1003, Procedure A, using CIE standard illuminant D65; and wherein a 3.2 mm thick sample of the optically diffusive plastic comprises a flexural modulus, measured at 23° C., of greater than or equal to 2,500 Megapascal (MPa) as determined by ASTM D790.

In another embodiment, an optically diffusive plastic comprising: 40 to 94.9 mass % of a polymer resin matrix; 5 to 50 mass % of a glass filler; and 0.1 to 10 mass % of a light diffusing component; wherein the difference between the refractive index of the polymer resin matrix and the refractive index of the glass filler is less than or equal to 0.02; wherein a 1 mm thick sample of the optically diffusive plastic comprises a DLD value of greater than or equal to 1° as measured by goniophotometry, and a total transmittance of greater than or equal to 40% for incident light having a wavelength of 360 nm to 750 nm in air, as determined by ASTM D1003 Procedure A, using CIE standard illuminant D65; and wherein a test sample of the optically diffusive plastic having a thickness of 1 mm, a width of 13.2 mm, and a length of 121 mm, is extended across a span of 60 mm exhibits a deflection of less than or equal to 10 mm when subjected to a load of 1 kgf applied by a load head having a 5 mm diameter and positioned in the center of the sample and center of the span in accordance to ASTM D5023.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
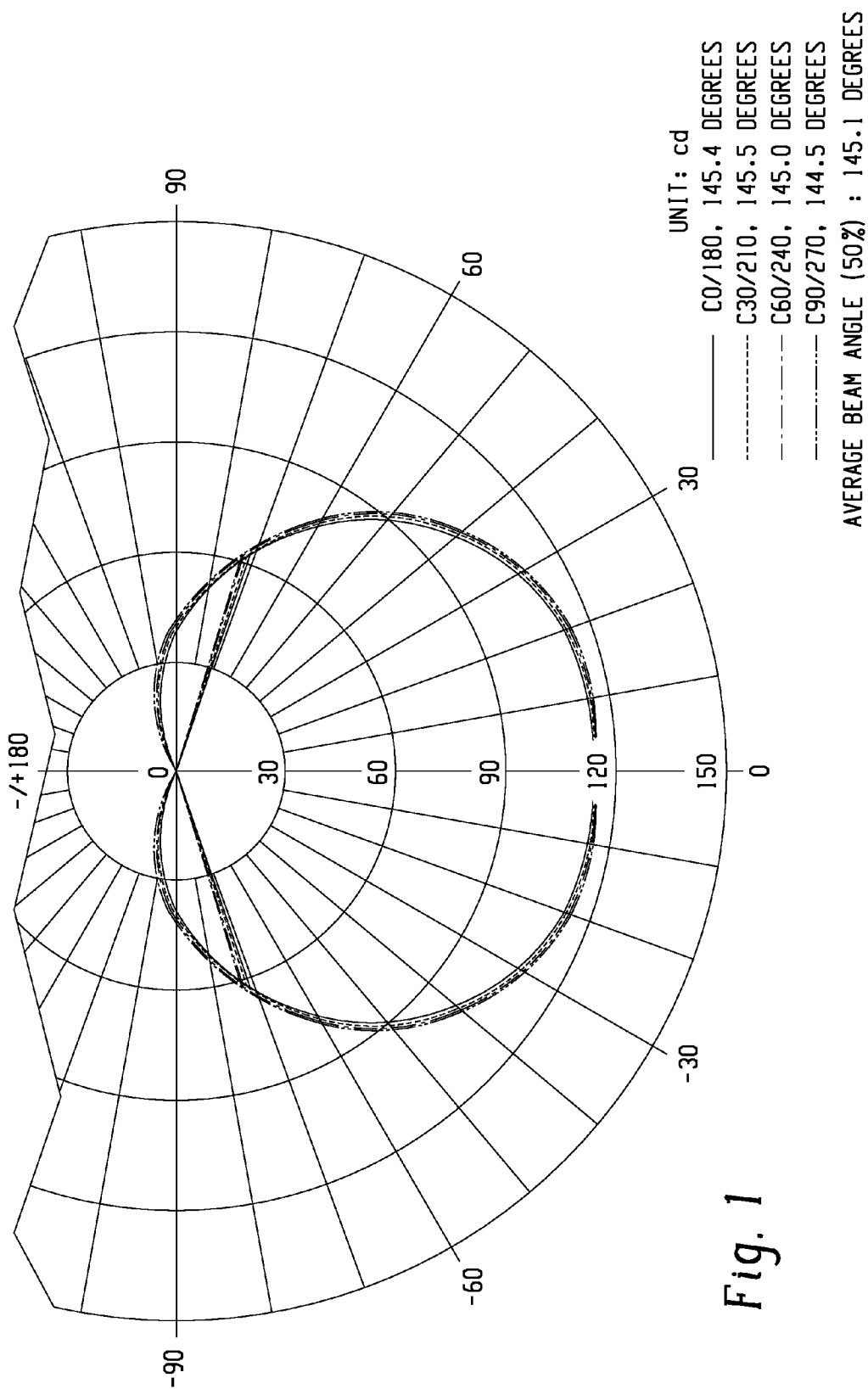
FIG. 1 is an illustration of the goniophotometric performance of Comparative Example C7.

A problem to be solved can include providing an optically diffusive plastic that can have good visible light transmittance, can have improved stiffness, can have improved impact resistance, and can be formulated to provide a range of DLD value for use in a variety of applications. The present subject matter can help provide a solution to this problem, such as by providing optically diffusive plastic compositions exhibiting transmittance of visible light of greater than or equal to 40%, improved stiffness, improved impact resistance, and a DLD value of greater than or equal to 1°, specifically, greater than or equal to 5°, and more specifically, greater than or equal to 10°. For example, a 3.2 mm thick plaque of the optically diffusive plastic composition comprises a flexural modulus, measured at 23° C., of greater than or equal to 2,500 MPa as determined by ASTM D790, specifically, greater than or equal to 3,000 MPa, more specifically, greater than or equal to 4,000 MPa, and even greater than or equal to 5,000 MPa.

An optically diffusive plastic material disclosed herein can include a polymer resin matrix, a glass filler, and a light diffusing component. These optically diffusive plastic materials can offer improved impact resistance in comparison to glass. These optically diffusive materials can offer reduced weight in comparison to glass. These optically diffusive plastic materials can offer improved stiffness in comparison to other polymeric compositions of the same thickness. These optically diffusive plastic materials can offer balanced light transmittance and diffusive effect in comparison to other polymeric compositions of the same thickness. These optically diffusive plastic materials can be formulated to provide a range of DLD values at a specified thickness for use in various applications.

Disposing glass filler in a polymer resin matrix can improve stiffness in comparison to polymeric resins free of glass filler. However, filling a polymer resin matrix with glass filler can reduce light transmittance of these materials. These filled polymeric resins can be opaque. Selecting glass filler with a refractive index (RI) similar to that of the polymer resin matrix can improve the light transmittance of the glass reinforced material. Polymeric resins, such as polycarbonate (PC) and poly(methyl methacrylate) (PMMA), when filled with a glass filler can have a high haze value in comparison to when these resins are free of glass filler. Thus, they can be undesirable for transparent applications. However, polymeric resins which are filled with a glass filler that has a refractive index (RI) that is matched closely to the RI of the polymeric material can offer improved performance (DLD, haze, transmittance, flexural modulus, and the like) in diffusive applications. These polymeric resins including glass filler having closely matched RI's can be useful in applications that demand both the stiffness and diffusive optical performance.

The polymer resin matrix of the optically diffuse materials can be formulated such that the difference between the refractive index (RI) of the polymer resin matrix and the RI of the glass filler is less than or equal to 0.02, for example, 0.0001 to 0.02, or, 0.001 to 0.01, or, 0.001 to 0.002 (e.g., 0.001). Reducing the difference between the RI of the polymer resin matrix and the RI of the glass filler can be achieved by reducing the RI of the thermoplastic resin composition. Reducing the difference between the RI of the polymer resin matrix and the RI of the glass filler can be achieved by increasing the RI of the glass filler.

The glass filler of the optically diffusive plastic material disclosed herein can include alkali resistant glass, electric resistant glass, barium crown glass, E-glass, D-glass, R-glass, E-CR-glass, C-glass, S-glass, and AE-glass or a combination comprising at least one of the foregoing. Some examples of the glass filler can include, but are not limited to, NEG T120-GF glass fiber commercially available from Nippon Electric Glass Co., Ltd., or ECS-307 glass fiber commercially available from Chonqing Polycomp International Corp. (CPIC) (Dadukou District Chongquing, China)

The example glass fillers provided in Table 1 are intended as a summary of exemplary glass fillers.

TABLE 1

Glass Fillers

| Acronym | Description | Identifier | Manufacturer |
|---------|-------------|------------|--------------|
| NB-GF | Non-bonding glass fibers | Glass Fiber NEG EX1026 non-bonding | Nippon Electric Glass |
| Bond-GF | Bonding glass fibers | 473A-14C | Owens Corning |
| M-GF | Milled glass fibers | MF7980 | Lanxess PTE.LTD |
| F-GF | Flat glass fibers, bonding | CSG 3PA-830 | Nittobo |
| G931F | Bonding glass fibers, standard 13 micrometers PBT glass | ECS303A | CPIC |
| TSE-GF | Glass fibers, crystalline TSE standard, bonding | CRATEC | Owens Corning |
| FiberG | Fiberglass, bonding | 14CRETEC | Owens Corning |

The optically diffusive plastic composition can include 5 mass % to 50 mass % glass filler, for example, 10 mass % to 50 mass %, or, 20 mass % to 40 mass %, or, 25 mass % to 35 mass % (e.g., 30 mass %), based on the combined mass of the total composition (polymeric resin(s), glass filler(s), light diffusing component(s), and other optional additives). The glass filler can be in the form of milled fibers, chopped fibers, powders, flakes, or a combination comprising at least one of the foregoing. The glass filler can be any shape, for example, spherical, cylindrical, irregular, plate-like, or fiber-like. A mixture of glass filler shapes can be used, e.g., fiber and flake.

The average largest dimension of the glass filler particles can be selected so as to provide the desired balance of optical and physical properties in the optically diffusive plastic composition, taking into account any breakage or other decrease in size that may occur during processing of the composition, e.g., during manufacture of the composition into a form suitable for the formation of an article. For example, when in fibrous form, the glass can be selected to provide a post-processing aspect ratio (the average ratio of length, L, to diameter, d, (L/d) of the fibers) of less than or equal to 1,000, for example, 1 to 800, or, 10 to 400, or, 20 to 200. The average diameter of the glass filler when in a fibrous form can be 1 micrometer (μm) to 24 μm, for example, 5 μm to 22 μm, or, 10 to 13 μm. The cross section of the glass fiber (taken in a plane perpendicular to the longest dimension of the fiber) can be any shape, e.g., circular, elliptical, polygonal, and irregular. For non-fibrous glass filler shapes, the average largest diameter of the glass post-processing may be 1 μm to 50 μm, for example, 5 μm to 40 μm, or, 7 μm to 30 μm. Multimodal particle size distributions can be used.

The refractive index of the glass filler can be from 1.564 to 1.582, for example, 1.564 to 1.576.

The optically diffusive plastic composition can include 0.01 mass % to 10 mass % of a light diffusing component, for example, 0.01 mass % to 8 mass %, or, 0.01 mass % to 5 mass %, based on the combined mass of the total composition (polymeric resin(s), glass filler(s), light diffusing component(s), and other optional additives).

The light diffusing component of the optically diffusive plastic material can include light diffusing organic or inorganic materials, or combinations of organic and inorganic materials. Examples of light diffusing organic materials can include poly(acrylates); poly(alkyl methacrylates), for example poly(methyl methacrylate) (PMMA); poly(tetrafluoroethylene) (PTFE); silicones, for example hydrolyzed poly(alkyl trialkoxysilanes) and polymethylsilsesquioxane (such as those commercially available under the trade name Tospearl™ from Momentive Performance Materials Inc.); or a combination comprising at least one of the foregoing organic materials, wherein the alkyl groups have from one to about twelve carbon atoms. Examples of light diffusing inorganic materials can include materials comprising antimony, titanium, barium, or zinc, for example the oxides or sulfides of the foregoing such as titanium dioxide, zinc oxide, antimony oxide, or a combination comprising at least one of the foregoing inorganic materials.

The light diffusing component can be any shape, e.g., including, but not limited to, spherical, sphere-like, an ellipsoid, cylindrical, and a polygon of rotation having straight or curved edges (a three dimensional polygonal shape symmetric about a rotational axis). A cross-sectional shape of the light diffusing component can be any shape, e.g., including, but not limited to, round, elliptical, and polygonal (having straight or curved edges). The light diffusing component can include particles having any particle size distribution, including multimodal distributions. The light diffusing component can have an average particle size of 0.1 μm to 70 μm, for example, 0.1 μm to 40 μm, or, 0.1 μm to 10 μm, or 2.0 μm. As used herein, the particle size is as measured along a major axis (i.e. the longest axis). The light diffusing component can include organosilicon resin beads. In an embodiment, the light diffusing component can include polymethylsilsesquioxane beads having an average particle size of 2.0 μm (e.g., Tospearl™ 120A beads commercially available from Momentive Performance Materials Inc.).

The optically diffusive plastic composition can include 40 mass % to 94.9 mass % polymer resin matrix, for example, 70 mass % to 90 mass %, or, 75 mass % to 85 mass %, or, 80 mass % to 82 mass % based on the combined mass of the total composition (polymeric resin(s), glass filler(s), light diffusing component(s), and other optional additive(s)). The polymer resin matrix of the optically diffusive plastic material can include a thermoplastic resin, a thermoset resin, or a combination comprising at least one of the foregoing.

Possible thermoplastic resins include, but are not limited to, oligomers, polymers, ionomers, dendrimers, copolymers such as graft copolymers and block copolymers (e.g., star block copolymers, random copolymers, and the like) or a combination comprising at least one of the foregoing. Examples of such thermoplastic resins include, but are not limited to, polycarbonates (e.g., 100 grade PCP, PCP 1300, and blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (PI) (e.g., polyetherimides (PEI)), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyethylene terephthalate (PET), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazanes, polysiloxanes, fluoropolymers (e.g., polyvinyl fluorides (PVF), polyvinylidene fluorides (PVDF), fluorinated ethylene-propylenes (FEP), polyethylene tetrafluoroethylenes (ETFE)), polyethylene naphthalates (PEN), cyclic olefin copolymers (COC), Poly(1,4-cyclohexylenedimethylene 1,4-cyclohexanedicarboxylate) (PCCD) and other polyester copolymers such as terephthalic acid copolymerized with cyclohexane dimethanol and ethylene glycol (e.g., poly(cyclohexanedimethylene terephthalate) (PCT), glycol modified PCT (PCTG), and glycol modified PET (PETG)), or a combination comprising at least one of the foregoing.

More particularly, a thermoplastic resin can include, but is not limited to, polycarbonate resins (e.g., LEXAN™ resins, including LEXAN™ CFR resins, LEXAN™ LUX resins, LEXAN™ LUX-G resins, and LEXAN™ LUX-T resins, commercially available from SABIC's Innovative Plastics business) polyphenylene ether-polystyrene resins (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate resins (e.g., XENOY™ resins, commercially available from SABIC's Innovative Plastics business), blends of PC and Polyester copolymer (e.g., XYLEX™ resins, commercially available from SABIC's Innovative Plastics business), copolyestercarbonate resins (e.g., LEXAN™ SLX resins, commercially available from SABIC's Innovative Plastics business), poly(aliphatic ester)-polycarbonate copolymer resins (e.g., LEXAN™ HFD resins, commercially available from SABIC's Innovative Plastics business) or a combination comprising at least one of the foregoing resins. Even more particularly, the thermoplastic resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane (e.g., LEXAN™ EXL and LEXAN™ EXL-T resins commercially available from SABIC's Innovative Plastics business), such as polycarbonate-polysiloxane block copolymer, polycarbonate-dimethyl bisphenol cyclohexane (DMBPC) polycarbonate copolymer (e.g., LEXAN™ DMX resin commercially available from SABIC's Innovative Plastics business), polycarbonate-poly(2-phenyl-3,3-bis(4-hydroxyphenyl)phthalimidine) copolymer (e.g., LEXAN™ XHT resins commercially available from SABIC's Innovative Plastics business)), linear polycarbonate, branched polycarbonate, end-capped polycarbonate (e.g., nitrile end-capped polycarbonate), or a combination comprising at least one of the foregoing, for example, a combination of branched and linear polycarbonate.

As used herein, the term "polycarbonate" means compositions having repeating structural carbonate units of formula (1)

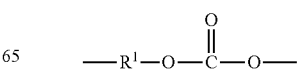

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

$$\text{HO-A}^1\text{-Y}^1\text{-A}^2\text{-OH} \tag{2}$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

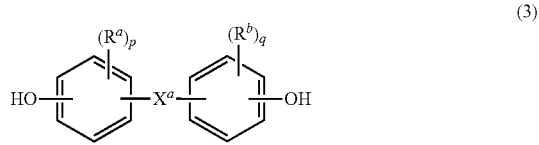

(3)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), Xa represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

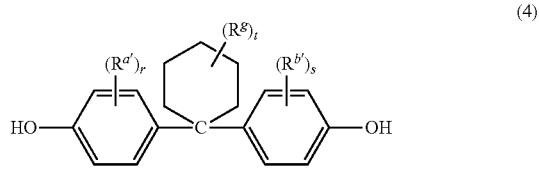

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

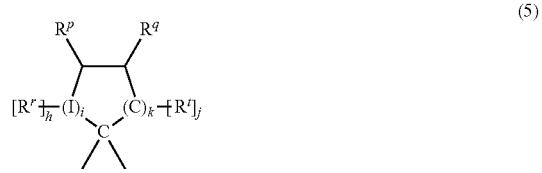

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is 1 and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (p,p-PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The homopolymer of DMBPC carbonate, which is represented by the x portion of formula (7) or its copolymer with BPA carbonate has an overall chemical structure represented by formula (7).

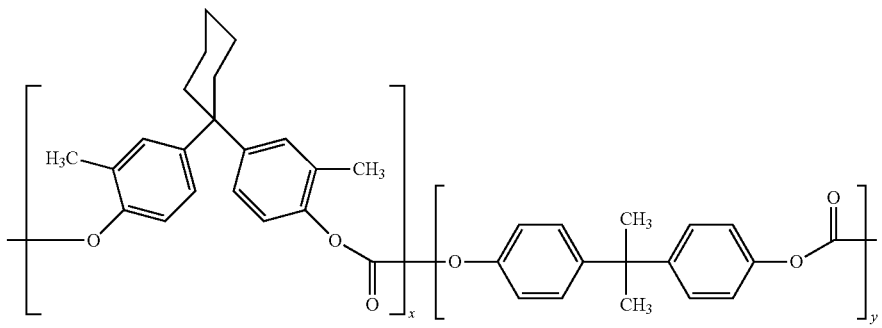

(7)

DMBPC carbonate can be co-polymerized with BPA carbonate to form a DMBPC BPA co-polycarbonate. For example, DMBPC based polycarbonate as a copolymer or homopolymer (DMBPC) can comprise 10 to 100 mol % DMBPC carbonate and 90 to 0 mol % BPA carbonate.

The method of making any of the polycarbonates herein described is not particularly limited. It may be produced by any known method of producing polycarbonate including the interfacial process using phosgene and/or the melt process using a diaryl carbonate, such as diphenyl carbonate or bismethyl salicyl carbonate, as the carbonate source.

"Polycarbonates" as used herein further include homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like.

The polycarbonate composition can further include impact modifier(s). Impact modifiers can be clear such as polycarbonate-polysiloxane (e.g., LEXAN™ EXL-T resin commercially available from SABIC's Innovative Plastics business), Exemplary impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. Impact modifiers are generally present in amounts of 1 to 30 weight percent (wt. %), based on the total weight of the polymers in the composition.

A polymer of optically diffusive plastic can include various additives ordinarily incorporated into polymer compositions of this type, with the proviso that the additive(s) are selected so as to not significantly adversely affect the desired properties of the polymeric composition, in particular hydrothermal resistance, water vapor transmission resistance, puncture resistance, and thermal shrinkage. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. The total amount of additives (other than any impact modifier, filler, or reinforcing agents) is generally 0.01 to 5 wt. %, based on the total weight of the composition.

Light stabilizers and/or ultraviolet light (UV) absorbing stabilizers can also be used. Exemplary light stabilizer additives include benzotriazoles such as 2-(2-hydroxy-5-methylphenyl)-benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the total composition, excluding any filler.

UV light absorbing stabilizers include triazines, dibenzoylresorcinols (such as TINUVIN™ 1577 commercially available from BASF and ADK STAB LA-46 commercially available from Asahi Denka), hydroxybenzophenones; hydroxybenzotriazoles; hydroxyphenyl triazines (e.g., 2-hydroxyphenyl triazine); hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB® UV-3638); 1,3-bis[[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with a particle size less than or equal to 100 nanometers (nm), or combinations comprising at least one of the foregoing UV light absorbing stabilizers. UV light absorbing stabilizers are used in amounts of 0.01 to 5 parts by weight, based on 100 parts by weight of the total composition, excluding any filler.

The optically diffusive plastic composition can include a silicone oil. The silicone oil can include a high viscosity silicone containing polyalkylphenylalkoxysiloxane. The silicone oil can be present in an amount of 0 to 5 wt. %, specifically 0.01 to 3 wt. %, based on the total weight of the composition. The silicone oil can comprise a polyalkylphenylalkoxysiloxane; where the silicone oil has a viscosity at 25° C. of 0.15 to 0.26 Pascal-Seconds (Pa·s). The silicone oil can include XR31-B8092 commercially available from Momentive.

The optically diffusive plastic material can be formed into an article using any plastic forming technique known in the art, e.g., a molding (such as blow molding), and forming (such as thermoforming, vacuum forming), and extruding process.

The optically diffusive plastic material can be formed into flat articles such as films having average thicknesses of 0.2 millimeters (mm) to 10 mm, for example, 0.2 mm to 5 mm, or, 0.5 mm to 3 mm. The optically diffusive plastic material can be formed into shaped articles such as optical elements (e.g., or an optical diffusers and optical lenses).

The optically diffusive plastic material can be used in various light diffusing applications. For example, a film of the optically diffusive material can be used in display panels (e.g., backlit display panels, such as panels using light emitting diode (LED) technologies, organic light emitting diode (OLED) technologies, liquid crystal display (LCD) technologies and the like), mobile electronic devices (e.g., laptops, mobile phones, personal digital assistants (PDA's), global positioning system (GPS's) and the like). Shaped articles of the optically diffusive plastic material can be used to disperse light from a light source to create a soft light, such as in various lighting applications, e.g., LED light bulbs.

A drawback of glass diffusers can be that their impact resistance is poor in comparison to polymeric light diffusers. A drawback of polymeric light diffusers can be that their stiffness is poor in comparison to glass light diffusers of the same thickness. By incorporating glass filler into the polymer resin matrix the stiffness of articles made therefrom can be improved. These stiffer, optically diffusive, articles can allow for their thickness, and resultant weight, to be reduced while maintaining their durability and impact resistance.

The optically diffusive plastic can transmit greater than or equal to 50% (e.g. 50 percent transmittance) of incident visible light (e.g., electromagnetic radiation having a frequency of 394 Terahertz (THz) to 857 THz, and/or at a wavelength of 350 nanometers (nm) to 760 nm in air), for example, 60% to 100%, or, 70% to 100%. A transparent polymer, material, or article can transmit greater than or equal to 50% of incident visible light, for example, 75% to 100%, or, 90% to 100%. Percent transmittance as used herein is determined using ASTM D1003, Procedure A, using a Haze-Gard test device. ASTM D1003 (Procedure A, Hazemeter, using Standard Illuminant C or alternatively Illuminant A with unidirectional illumination with diffuse viewing) defines percent transmittance as:

$$\%T = \left(\frac{I}{I_o}\right) \times 100\% \tag{8}$$

wherein: I=intensity of the light passing through the test sample
$I_o$=Intensity of incident light.

Figure 11:
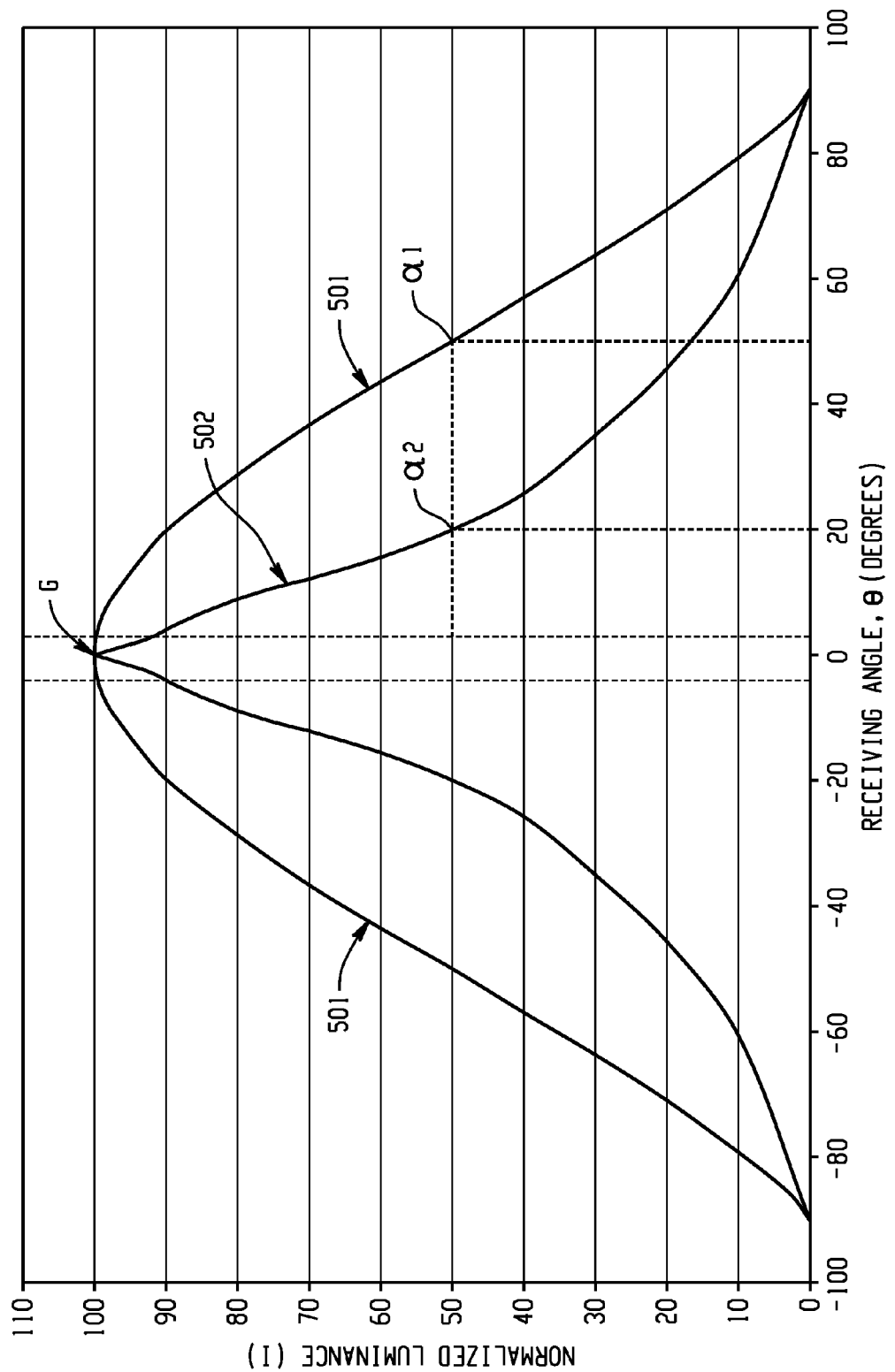
FIG. 11 is a graphical illustration of the definition of DLD.

The hiding power of an optically diffusive plastic for use in a diffusive film application can be the ability to "hide" a light source incident on a back side of the film from view by an observer viewing the other side of film. The degree of light dispersion (DLD) is an index which can be used to quantify the hiding power of various films (including films having different compositions, shapes, surface features, orientations and the like). The definition of DLD is illustrated in FIG. 11, where the luminance $I_\theta$ (abscissas coordinate) corresponds to the normalized (e.g., maximum value equals 100) amount of incident light that transmits through the film along the specific receiving angle θ (ordinate coordinate). The luminance peak value G is the amount of incident light that transmits through the film at a θ of 0° degrees. The DLD α corresponds to the receiving angle θ to obtain ½ the value of G. In FIG. 11, an article having diffuse transmission can be represented by line 501 which can have a DLD corresponding to receiving angle of α1, while line 502 illustrates coherent transmission light which can have a DLD corresponding to the receiving angle α2.

Figure 12:
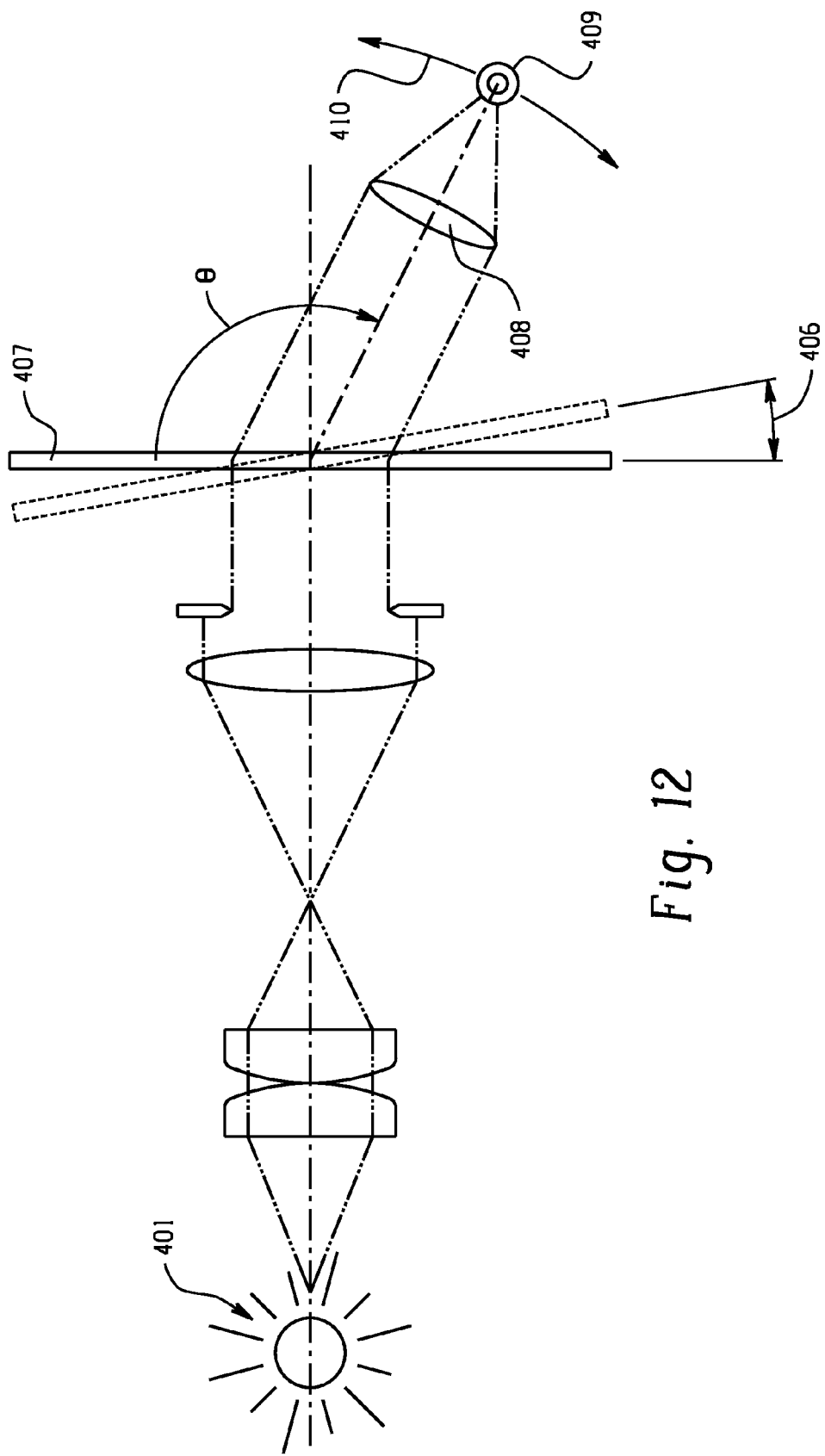
FIG. 12 is a schematic of a goniophotometer measuring a sample.

The DLD of a sample can be measured with a goniophotometer as shown in FIG. 12. As can be seen in FIG. 12, a light source 401 can be used in the DLD test and a set of collimator lens are used to transfer the wide angle light into parallel light beams. The parallel light beams can be perpendicular to the sample 407. An incident angle 406 can be imparted on the sample for specific tests. The parallel light is scattered after passing through the sample 407. The photo detector 409 can measure the luminance intensity by employing lens 408 while moving along the arrow 410 from a receiving angle θ from 0° to 180° relative to the plane of the sample 407. The measurements taken herein were on a GP200 goniophotometer.

EXAMPLES

Various plastic compositions were formed into flat sheets and tested for visible light transmittance, haze and DLD value at thicknesses of 1 mm, 2 mm, and 3 mm. The flexural modulus of each sample was determined per ASTM D790. Tables 2-4 show the compositions of each sample and the results of these tests.

Comparative Example C1 shows that polycarbonate composition with 20 mass % of a glass fiber is anisotropic, having a DLD value of 12.1 for vertically polarized visible light and 7.8 for horizontally polarized visible light at 1 mm thickness, and 18.3 for vertically polarized visible light and 13.1 for horizontally polarized visible light at 2 mm thickness. Example E1 includes 20 mass % glass fiber and is free of a light diffusing component, however this composition provides isotropic optical performance. Comparative Example C1 has high haze and low transmittance values in comparison to Example E2. This result can be due to the difference in refractive index between the glass filler and polymeric matrix. However, Example E1 and Comparative Example C1 have the same flexural modulus. Example E2 and Comparative Example C3 included 0.1 mass % of Tospearl™ 120 (a light diffusing component comprising methylsilsesquioxane beads having an average particle size of 2.0 μm). Example E2 relative to Comparative Example C3 shows improved DLD value with the addition of glass filler and the light diffusing component. Example E2 also shows more than double the flexural modulus relative to Comparative Example C3.

Table 3 shows that the disclosed optically diffusive plastic composition can be formulated to achieve a difference in refractive index (RI) of the glass filler and the polymer resin matrix of 0.001 (E3 and E5). The optically diffusive plastic composition of E3 can achieve a larger DLD value at 1 mm thickness and exhibit a higher flexural modulus relative to Comparative Examples C4 and C5, while maintaining similar transmittance. The optically diffusive plastic composition of E4, E5, and E5-1 relative to Comparative Example C6 showed that for the same amount of light diffusing component the optically diffusive plastic can achieve a greater DLD value at 1 mm and 2 mm thicknesses, and provide more than double the flexural modulus. Example E3 at 1 mm thickness had nearly the same DLD value and improved transmittance as the Comparative Example C6 at 2 mm thickness, indicating that the thickness of the disclosed optically diffusive plastic can be reduced while achieving similar or improved optical performance. A comparison of E3, E4, and E5-2 showed that reducing the difference between the RI of the glass filler and the polymer resin matrix can increase the DLD value at the same thickness without affecting the transmittance.

Table 4 provides a comparison of polycarbonate compositions incorporating a light diffusing component in comparison to the disclosed optically diffusive plastics. The Tospearl™ 120 light diffusing component was incorporated into the polycarbonate of Comparative Examples C7, C8, and C9 to achieve a target DLD value of 20 as measured by goniophotometry and into the polycarbonate of Comparative Examples C10, C11, and C12 to achieve a target DLD value of 50 as measured by the goniophotometric method described in the foregoing. It can be seen, at both a DLD value of 20 and at a DLD value of 50, that as the thickness of the samples increased, less light diffusing component can be used to achieve the target DLD value. Example E6 of the disclosed optically diffusive plastic can achieve nearly the same DLD value as the Comparative Examples C7 (having the same thickness as E6) with less light diffusing component. Example E7 of the disclosed optically diffusive plastic can achieve nearly the same DLD value as the Comparative Examples C10 (having the same thickness as E7) with less light diffusing component. Furthermore, the difference in refractive index (RI) of both Examples E6 and E7 was 0.007, reducing this difference can further increase the transmittance and DLD value of these samples as was shown in Table 3 (comparison of E3 and E4).

Figure 2:
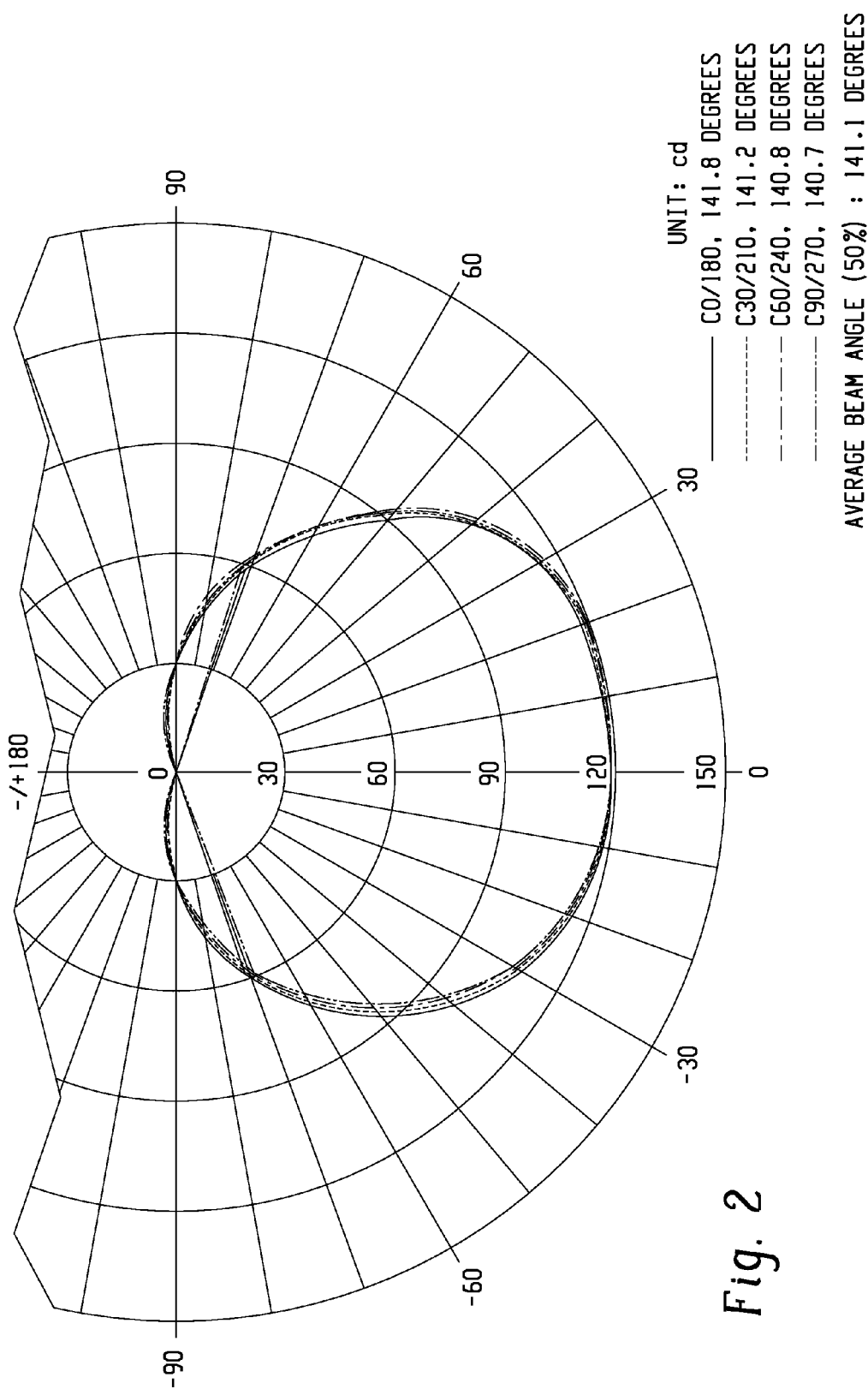
FIG. 2 is an illustration of the goniophotometric performance of Comparative Example C8.
Figure 3:
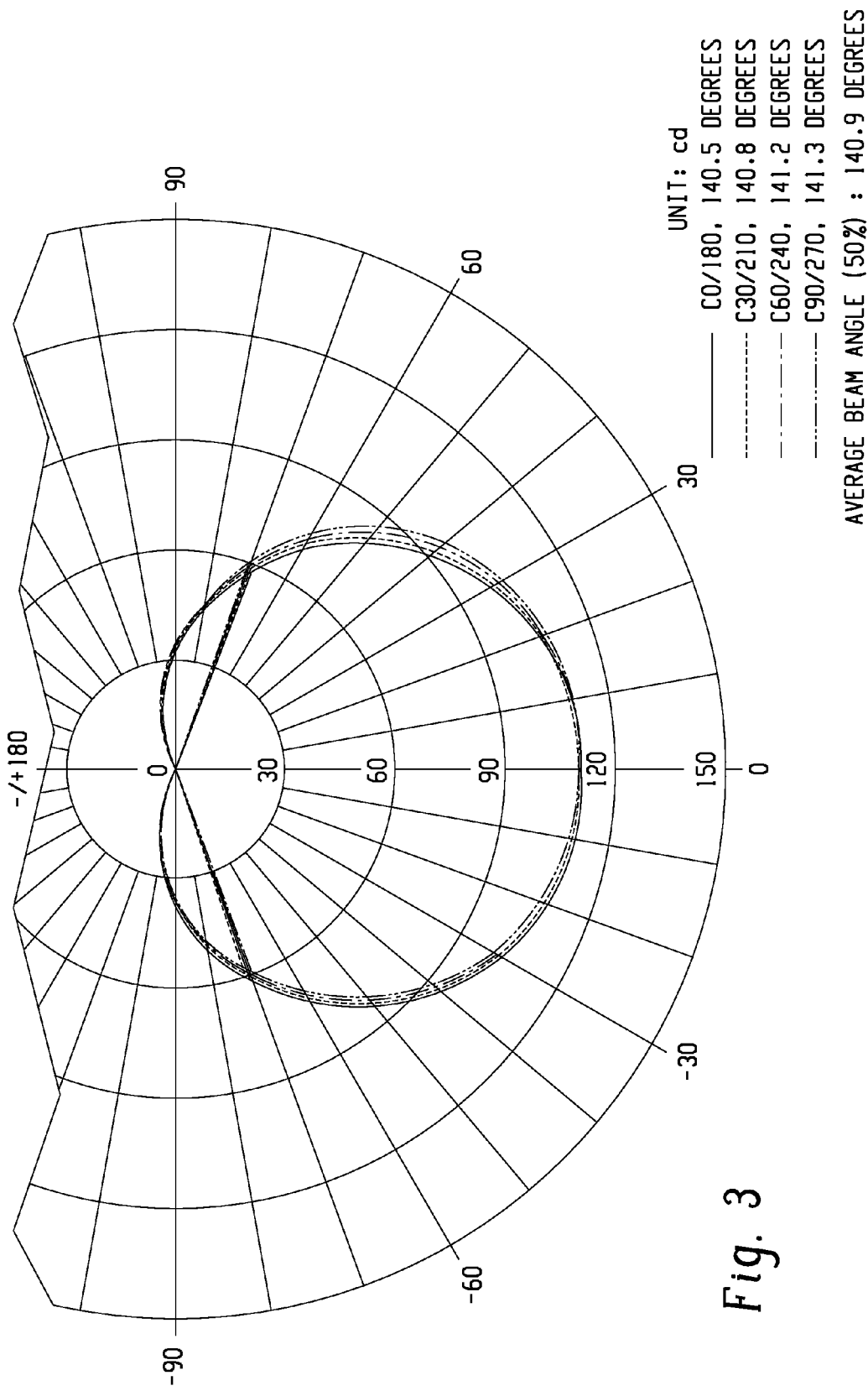
FIG. 3 is an illustration of the goniophotometric performance of Comparative Example C9.
Figure 4:
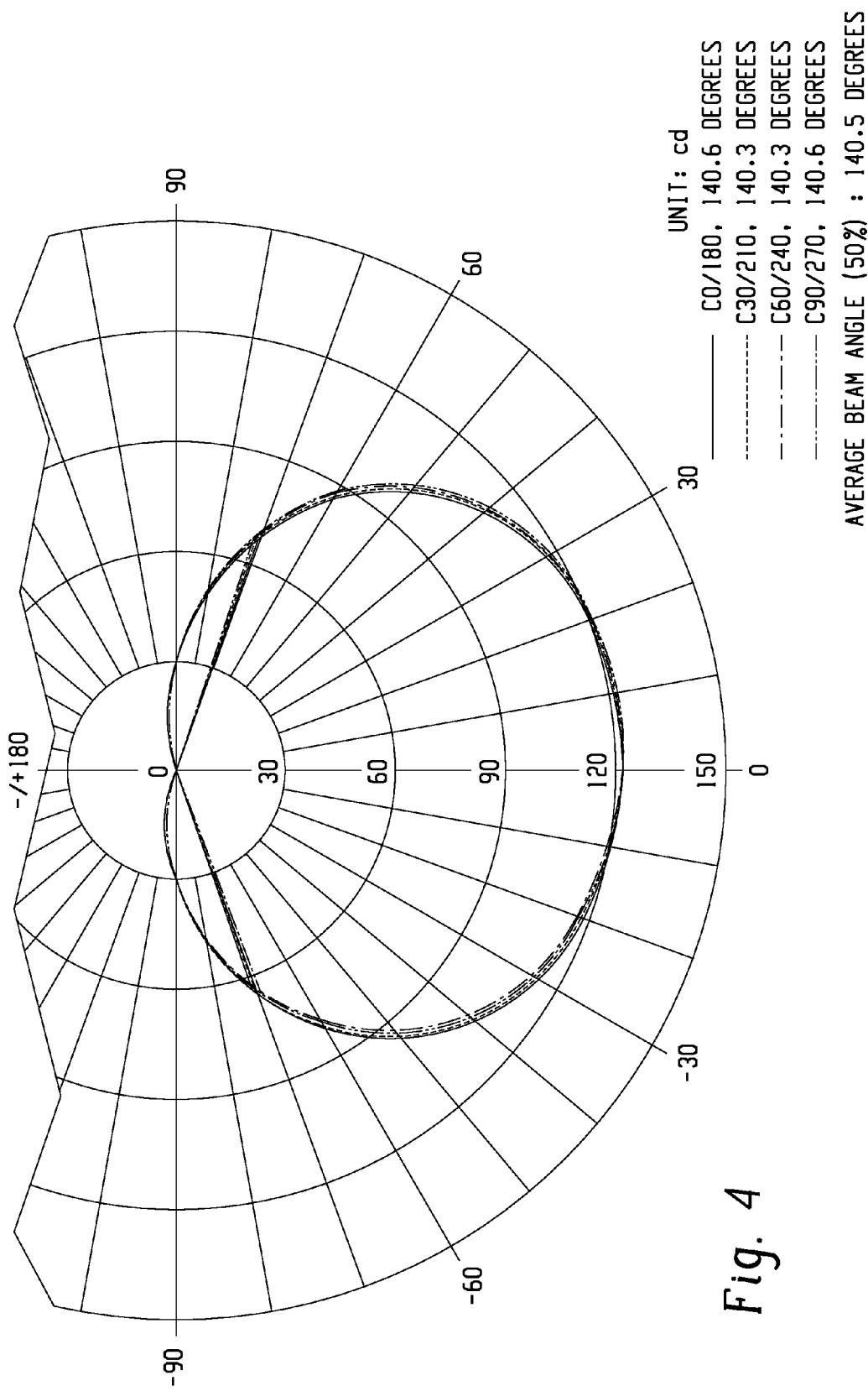
FIG. 4 is an illustration of the goniophotometric performance of Example E6.
Figure 5:
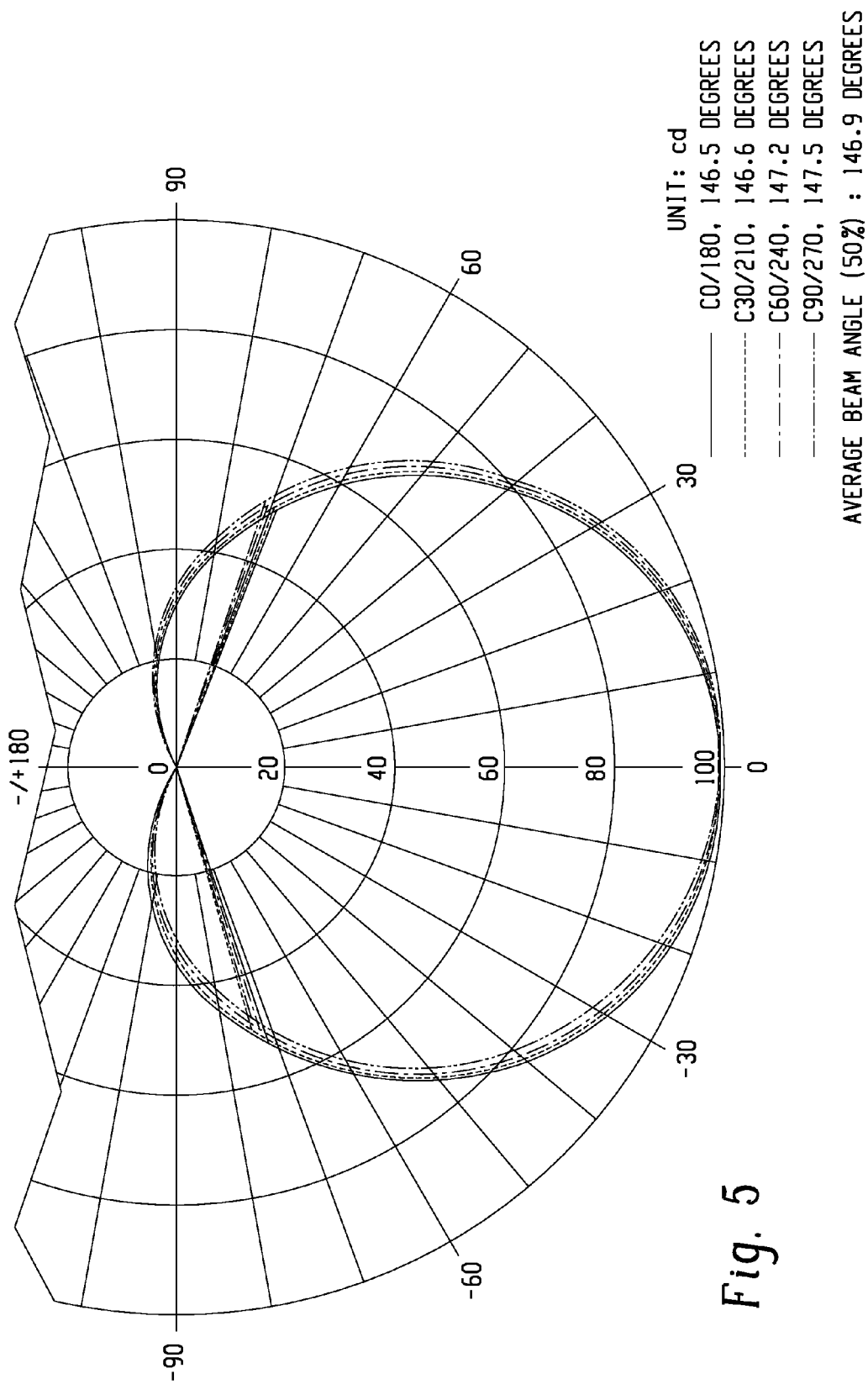
FIG. 5 is an illustration of the goniophotometric performance of Comparative Example C10.
Figure 6:
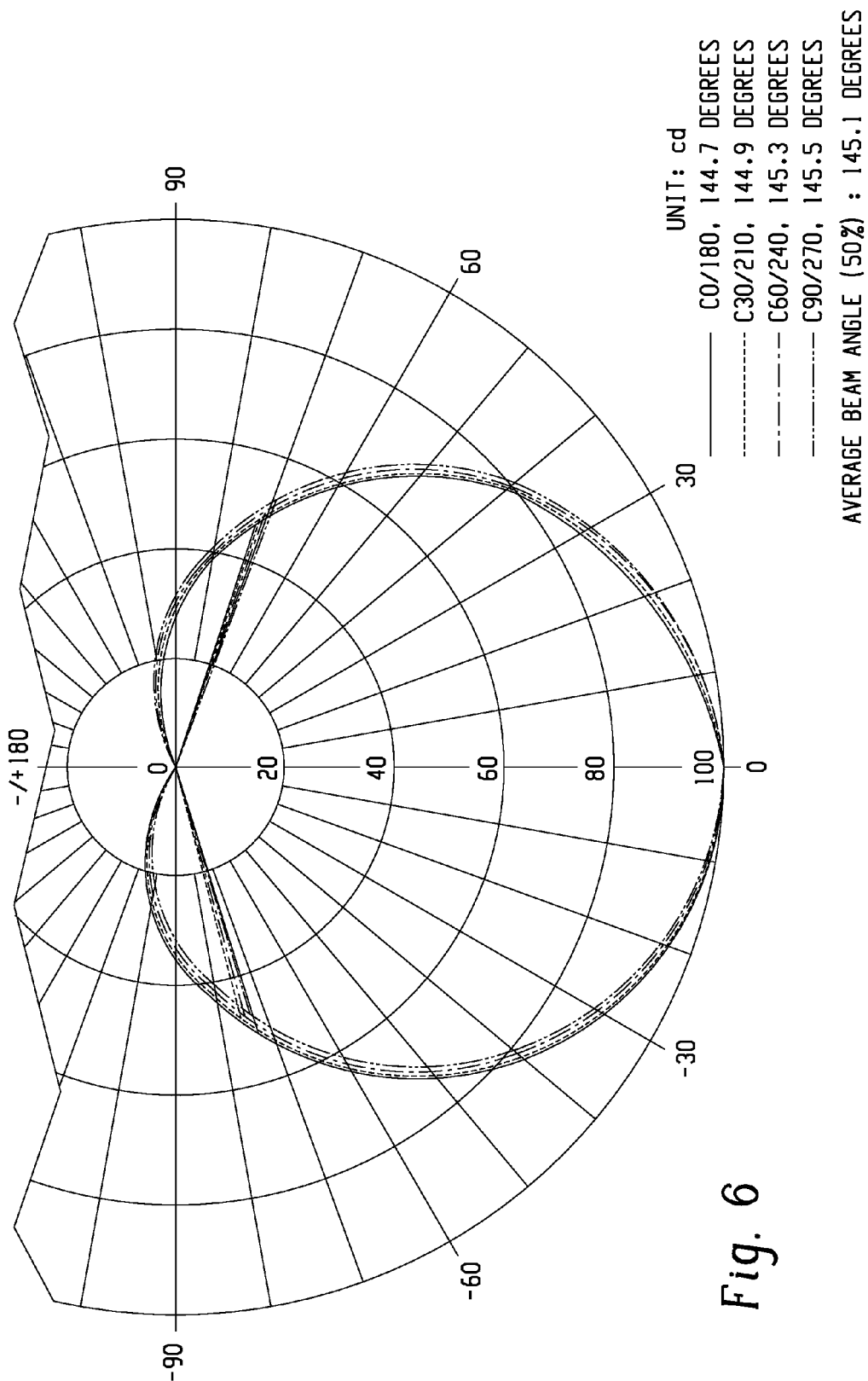
FIG. 6 is an illustration of the goniophotometric performance of Comparative Example C11.
Figure 7:
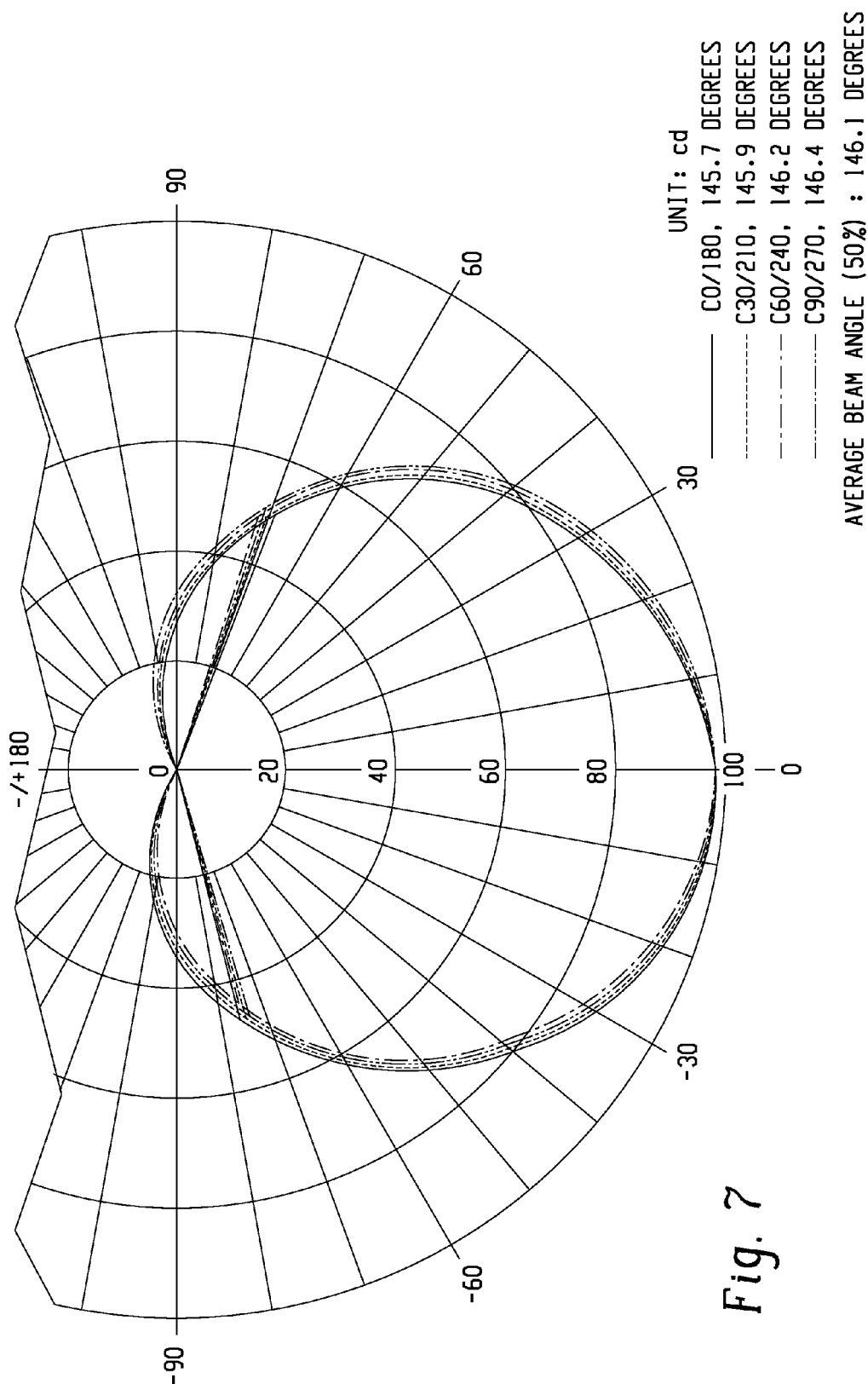
FIG. 7 is an illustration of the goniophotometric performance of Comparative Example C12.
Figure 8:
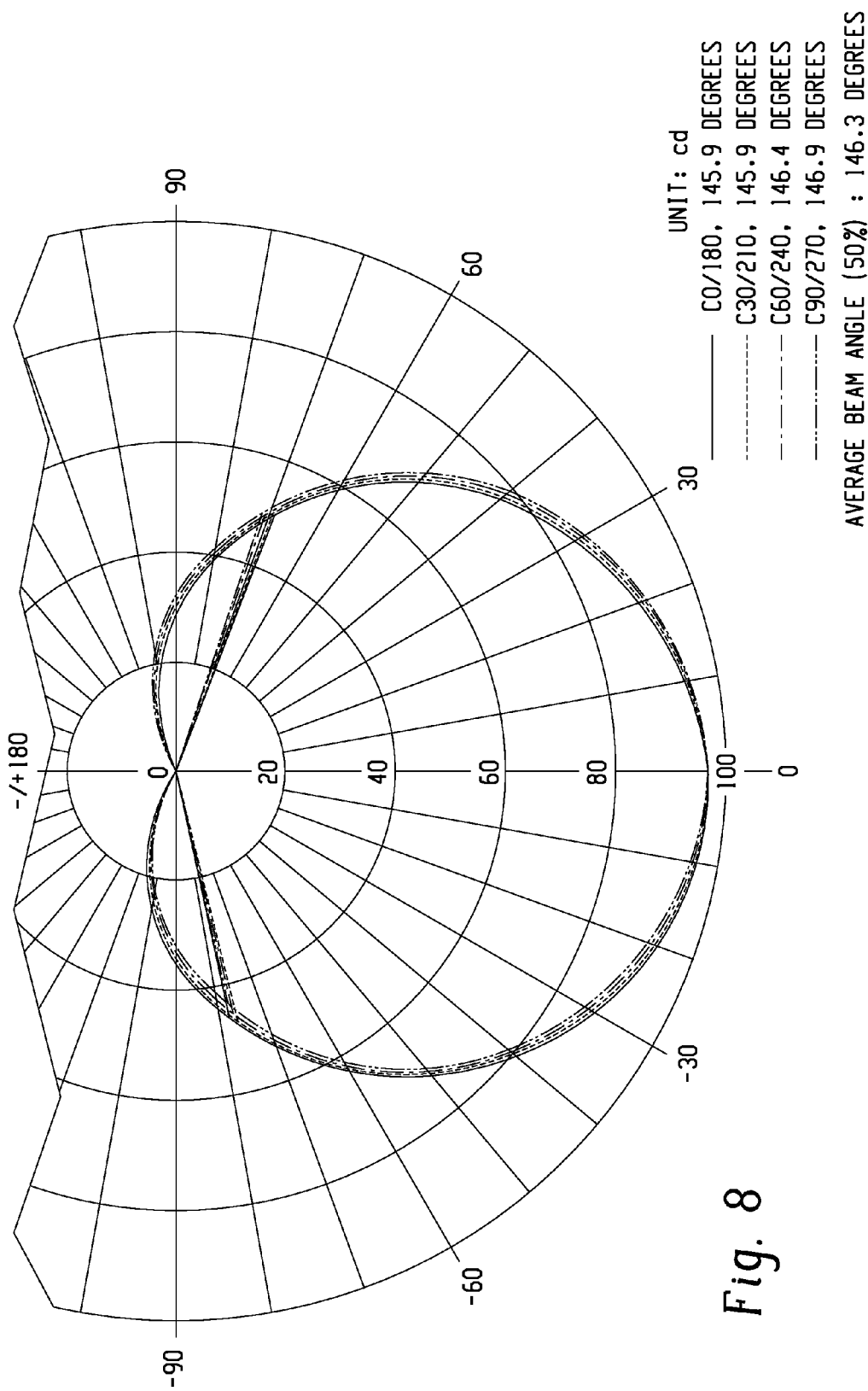
FIG. 8 is an illustration of the goniophotometric performance of Example E7.

The isotropic performance of the samples of Table 4 can further be seen in FIGS. 1-8 which show goniophotometric results. FIGS. 1-3 show the goniophotometric results for Comparative Examples C7, C8, and C9, and FIG. 4 shows the goniophotometric results for Example E6. FIGS. 5-7 show the goniophotometric results for Comparative Examples C10, C11, and C12, and FIG. 8 shows the goniophotometric results for Example E7. It can be seen from the figures that the disclosed optically diffusive plastic can achieve similar isotropic optical performance in comparison to polycarbonate. The presence of glass fillers in Examples E6 and E7 does not result in anisotropic optical performance.

Figure 9:
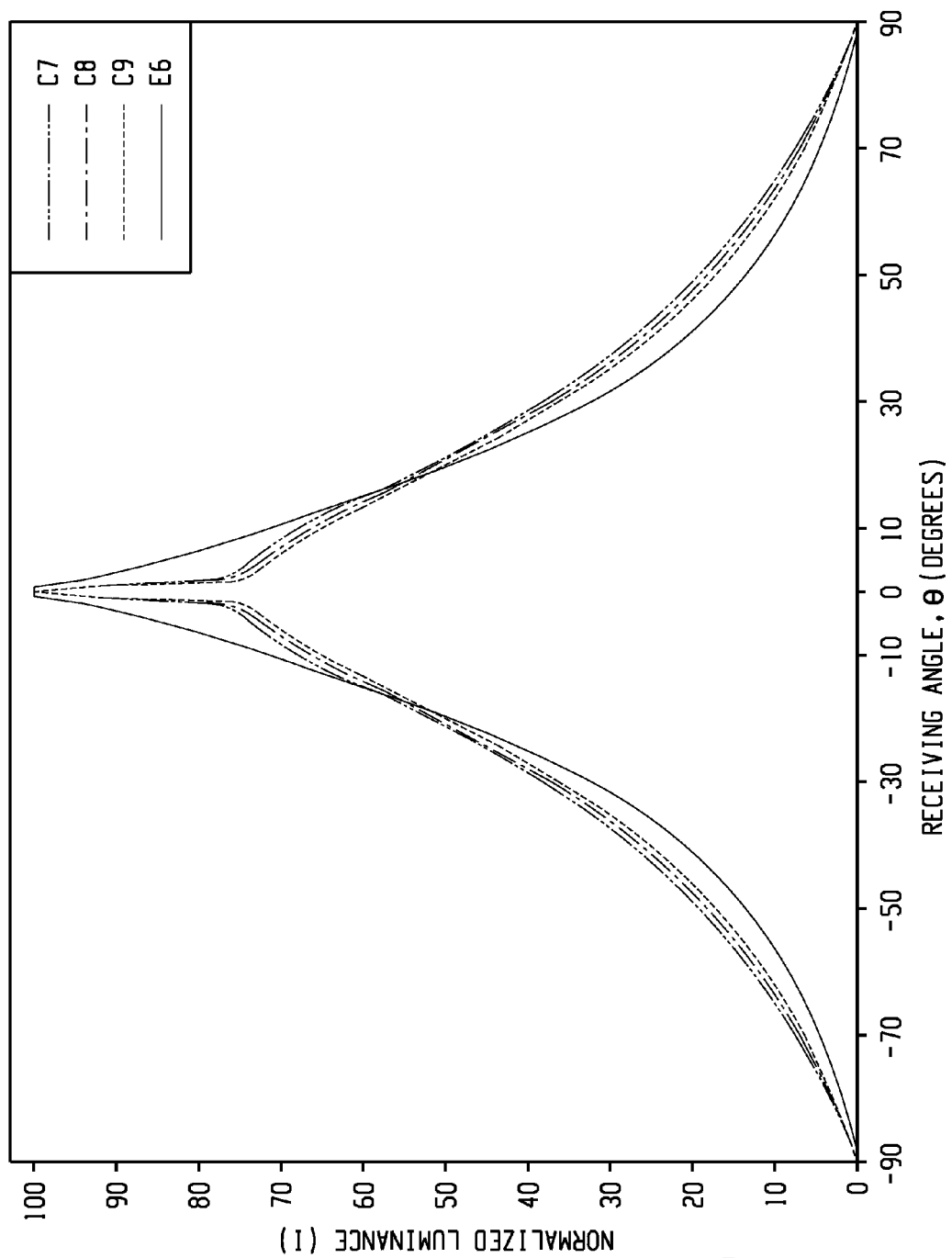
FIG. 9 is a graphical illustration of the transmittance versus angle of incidence of Example E6 and Comparative Examples C7, C8, and C9.
Figure 10:
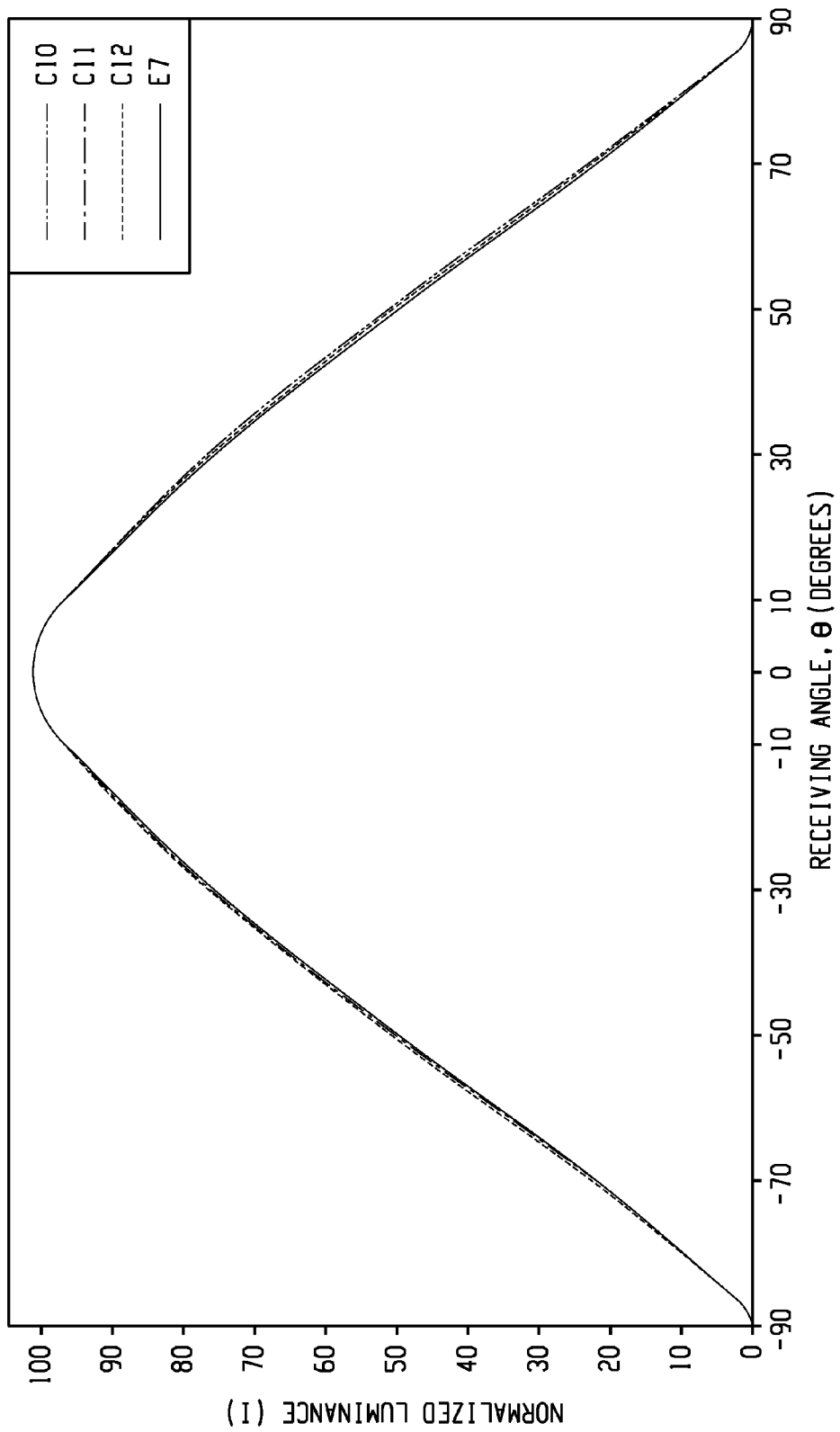
FIG. 10 is a graphical illustration of the transmittance versus angle of incidence of Comparative Examples C10, C11, and C12, and Example E7.

FIGS. 9-10 are graphical illustrations of the transmittance percent as a function of the angle of incidence onto the samples of Table 4. FIG. 9 shows that the optically diffusive plastic of Example E6 can provide improved small angle dispersion capability versus Comparative Examples C7, C8, and C9. FIG. 10 shows that at a DLD value of 50 the transmittance of Example E7 is nearly the same as the Comparative Examples C10, C11, and C12.

Table 5 shows the results of stiffness testing performed on Comparative Examples C7, C8, C9, and Example E6 each of which were formulated to exhibit a DLD value of 20. Table 6 shows the results of stiffness testing performed on Comparative Examples C10, C11, C12, and Example E7 each of which were formulated to exhibit a DLD value of 50. The testing of each sample followed ASTM D5023 using a load device having a head diameter of 5 mm and a setting stroke of 10 mm. Each of the samples had a width of 13.2 mm and a length of 121 mm. The average thickness of each sample was chosen to be 1 mm, 1.5 mm, or 2 mm, as shown in Tables 5 and 6. Each sample was positioned in a test fixture, between two supports separated by a 60 mm span, with the thickness dimension parallel to the direction in which the load was to act. The load head of the load device was centered on the sample, and centered between the span, perpendicular to the plane defined by the length and width. The load head was then actuated to apply a measured load to the sample. The displacement (or deflection) of the center of the sample, relative to the center of the sample when unloaded, was set to a predetermined value (2 mm, 4, mm, 6 mm, 8 mm, or 10 mm) and the force of the load head for each displacement was measured. The results of these tests are shown in Tables 5 and 6. The results of these tests showed that, at the same thickness, Examples E6 and E7 could withstand a higher load than the Comparative Examples 7 and 10. From linear interpolation of these results it was concluded that Examples E6 and E7 would exhibit a deflection of less than or equal to 8 mm when subjected to a load of 1 kilogram force (kgf), (e.g., linear interpolation of the results at 6 mm and 8 mm deflection indicate that at a load of 1 kgf then displacement of E6 would be 7 mm and the displacement of E7 would be 7.1 mm) Furthermore, it can be concluded that a force of greater than or equal to 1.26 kgf would displace Examples E6 and E7 by 10 mm or more. Still further it can be concluded that if the amount of glass filler were reduced in Examples E6 and E7 they can still be displaced less than 10 mm under a force of 1 kgf.

TABLE 2

Transmittance, Haze, and DLD Value for Various Plastic Compositions

| | Description | Units | C1 | E1 | C2 | E2 | C3 |
|---|---|---|---|---|---|---|---|
| B8092 | XR31-B8092, GETOS Silicone FR | Mass % | | 1 | | 1 | |
| F8260 | Monozinc phosphate (MZP) | Mass % | | 0.02 | | 0.02 | |
| F207 | Phosphonous acid ester, PEPQ powder | Mass % | | 0.15 | | 0.15 | |
| F538 | Pentaerythritol tetrastearate | Mass % | | 0.27 | | 0.27 | |
| C017 | PCP 1300 | Mass % | 80 | 15.1 | | 15.1 | |
| F9682 | PCCD | Mass % | | 15 | | 15 | |
| C9030T | EXL-T | Mass % | | 48.46 | | 48.46 | |
| C023A | 100 Grade PCP | Mass % | | | 100 | | 100 |
| 5103-B | NEG T120-GF | Mass % | | 20 | | 20 | |
| G513128 | CPIC ECS-307 | Mass % | 20 | | | | |
| | Refractive Index (RI) of Glass Filler | | 1.564 | 1.564 | | 1.564 | |
| | Refractive Index (RI) of Resin Matrix | | 1.586 | 1.563 | | 1.563 | |
| | RI difference between Resin Matrix and Glass Filler | | 0.022 | 0.001 | | 0.001 | |
| | Light Diffusing Component (Tospearl ™ 120) | Mass % | 0 | 0 | 0 | 0.1 | 0.1 |
| 1 mm Thickness | Transmittance | % | 85.2 | 86.1 | >90 | 85.7 | 89.2 |
| | Haze | % | 92.5 | | <0.5 | >95 | >95 |
| | DLD Value | | 12.1(V)/7.8/(H) | 1.5 | 0 | 1.6 | 1.3 |
| 2 mm Thickness | Transmittance | % | 82.2 | 82.9 | >90 | 79.8 | 84.5 |
| | Haze | % | 96.6 | 26 | <0.5 | >95 | >95 |
| | DLD Value | | 18.3(V)/13.1/(H) | 1.6 | 0 | 2.2 | 1.4 |
| 3 mm Thickness | Transmittance | % | | 78.4 | | 72.3 | 78.6 |
| | Haze | % | | | | >95 | >95 |
| | DLD Value | | | 1.8 | | 13.7 | 1.5 |
| | Flexural Modulus at 23° C. | MPa | 5000 | 5000 | 2300 | 5000 | 2300 |

TABLE 3

Transmittance, Haze, and DLD Value for Various Plastic Compositions

| | Description | Units | C4 | C5 | E3 | E4 | C6 | E5 | E5-1 | E5-2 |
|---|---|---|---|---|---|---|---|---|---|---|
| B8092 | XR31-B8092, GETOS Silicone FR | Mass % | | | 1 | 1 | | 1 | | |
| F8260 | Monozinc phosphate (MZP) | Mass % | | | 0.02 | 0.02 | | 0.02 | | |
| F207 | Phosphonous acid ester, PEPQ powder | Mass % | | | 0.15 | 0.15 | | 0.15 | | |
| F535 | Potassium diphenylsulphon-3-sulphonate (KSS) | Mass % | | | | | 0.03 | | 0.03 | 0.03 |
| F528 | 2-(2'HYDROXY-5-T-OCTYLPHENYL)-BENZOTRIAZOLE | Mass % | | | | | | | 0.13 | 0.13 |
| F542 | Phosphite Stabilizer | Mass % | | | | | 0.05 | | 0.05 | 0.05 |
| F538 | Pentaerythritol tetrastearate | Mass % | | | 0.27 | 0.27 | 0.35 | 0.27 | 0.35 | 0.35 |
| C017 | PCP 1300 | Mass % | | | 15.1 | 53.56 | 49.72 | 15.1 | 39.72 | 39.72 |
| F9682 | PCCD | Mass % | | | 15 | 15 | | 15 | | |
| C9030T | EXL-T | Mass % | | | 48.46 | | | 48.46 | | |
| C023A | 100 Grade PCP | Mass % | 100 | 100 | | 10 | 49.72 | | 39.72 | 39.72 |
| 5103-B | NEG T120-GF | Mass % | | | 20 | 20 | | 20 | 20 | 20 |
| | Refractive Index (RI) of Glass Filler | | | | 1.564 | 1.564 | | 1.564 | 1.564 | 1.564 |
| | Refractive Index (RI) of Resin Matrix | | | | 1.563 | 1.571 | | 1.563 | 1.584 | 1.584 |
| | RI difference between Resin Matrix and Glass Filler | | | | 0.001 | 0.007 | | 0.001 | 0.02 | 0.02 |
| | Light Diffusing Component (Tospearl ™ 120) | Mass % | 0.472 | 0.5 | 0.5 | 0.3 | 0.3 | 0.3 | 0.3 | 0.225 |
| 1 mm Thickness | Transmittance | % | 76.02 | 76.1 | 75.4 | 74.08 | 82.3 | 81.3 | 71.8 | 74.2 |
| | Haze | % | >95 | >95 | >95 | >95 | >95 | >95 | | |
| | DLD Value | | | 21.3 | 23.2 | 33.7 | 20 | 1.6 | 11.3 | 29.9 | 26.8 |

TABLE 3-continued

Transmittance, Haze, and DLD Value for Various Plastic Compositions

|  | Description | Units | C4 | C5 | E3 | E4 | C6 | E5 | E5-1 | E5-2 |
|---|---|---|---|---|---|---|---|---|---|---|
| 2 mm | Transmittance | % |  | 59.1 | 59.2 |  | 66.8 | 66.5 | 55.1 | 60.7 |
| Thickness | Haze | % |  | >95 | >95 |  | >95 | >95 |  |  |
|  | DLD Value |  |  | 51.5 | 50.7 |  | 34.7 | 37.4 | 47.2 | 42.1 |
| 3 mm | Transmittance | % | 45.8 |  | 49.5 |  |  | 55.3 |  |  |
| Thickness | Haze | % | >95 |  | >95 |  |  | >95 |  |  |
|  | DLD Value |  | 60 |  | 56 |  |  | 46.7 |  |  |
| Flexural Modulus at 23° C. |  | MPa | 2300 | 2300 | 5000 | 5000 | 2300 | 5000 | 5000 | 5000 |

TABLE 4

Transmittance, Haze, and DLD Value for Various Plastic Compositions at a Target DLD Value

|  | Description | Units | C7 | C8 | C9 | E6 | C10 | C11 | C12 | E7 |
|---|---|---|---|---|---|---|---|---|---|---|
| B8092 | XR31-B8092, GETOS Silicone FR | Mass % |  |  |  | 1 |  |  |  | 1 |
| F8260 | Monozinc phosphate (MZP) | Mass % |  |  |  | 0.02 |  |  |  | 0.02 |
| F207 | Phosphonous acid ester, PEPQ powder | Mass % |  |  |  | 0.15 |  |  |  | 0.15 |
| F538 | Pentaerythritol tetrastearate | Mass % |  |  |  | 0.27 |  |  |  | 0.27 |
| C017 | PCP 1300 | Mass % |  |  |  | 53.56 |  |  |  | 53.56 |
| F9682 | PCCD | Mass % |  |  |  | 15 |  |  |  | 15 |
| C9030T | EXL-T | Mass % |  |  |  |  |  |  |  |  |
| C023A | 100 Grade PCP | Mass % | 100 | 100 | 100 | 10 | 100 | 100 | 100 | 10 |
| 5103-B | NEG T120-GF | Mass % | 0 | 0 | 0 | 20 | 0 | 0 | 0 | 20 |
| G513128 | CPIC ECS-307 | Mass % |  |  | 0 |  | 0 |  | 0 |  |
| Refractive Index (RI) of Glass Filler |  |  |  |  |  | 1.564 |  |  |  | 1.564 |
| Refractive Index (RI) of Resin Matrix |  |  |  |  |  | 1.571 |  |  |  | 1.571 |
| RI difference between Resin Matrix and Glass Filler |  |  |  |  |  | 0.007 |  |  |  | 0.007 |
| Light Diffusing Component (Tospearl ™ 120) |  | Mass % | 0.472 | 0.318 | 0.24 | 0.3 | 0.903 | 0.602 | 0.46 | 0.84 |
| Target DLD Value |  |  |  | 20 |  |  |  | 50 |  |  |
| 1 mm | Transmittance | % | 76.02 |  |  | 74.08 | 66.52 |  |  | 64.9 |
| Thickness | Haze | % | >95 |  |  | >95 | >95 |  |  | >95 |
|  | DLD Value |  | 21.3 |  |  | 20 | 50.2 |  |  | 50 |
| 2 mm | Transmittance | % |  | 73.3 |  |  |  | 63.2 |  |  |
| Thickness | Haze | % |  | >95 |  |  |  | >95 |  |  |
|  | DLD Value |  |  | 20.7 |  |  |  | 50.2 |  |  |
| 3 mm | Transmittance | % |  |  | 70.68 |  |  |  | 59.5 |  |
| Thickness | Haze | % |  |  | >95 |  |  |  | >95 |  |
|  | DLD Value |  |  |  | 20.4 |  |  |  | 50.2 |  |
| Flexural Modulus at 23° C. |  | MPa | 2300 | 2300 | 2300 | 5000 | 2300 | 2300 | 2300 | 5000 |

TABLE 5

Load versus Displacement at DLD Value of 20

| Displacement | Load (kgf) | | | | |
|---|---|---|---|---|---|
|  | 2 mm | 4 mm | 6 mm | 8 mm | 10 mm |
| C7 @ 1 mm | 0.14 | 0.26 | 0.37 | 0.46 | 0.53 |
| C8 @ 1.5 mm | 0.42 | 0.80 | 1.15 | 1.43 | 1.63 |
| C9 @ 2 mm | 0.93 | 1.86 | 2.65 | 3.29 | 3.71 |
| E6 @ 1 mm | 0.32 | 0.62 | 0.90 | 1.10 | 1.26 |

TABLE 6

Load versus Displacement at DLD Value of 50

| Displacement | Load (kgf) | | | | |
|---|---|---|---|---|---|
|  | 2 mm | 4 mm | 6 mm | 8 mm | 10 mm |
| C10 @ 1 mm | 0.13 | 0.24 | 0.36 | 0.44 | 0.51 |
| C11 @ 1.5 mm | 0.42 | 0.80 | 1.16 | 1.44 | 1.63 |
| C12 @ 2 mm | 0.95 | 1.87 | 2.70 | 3.33 | 3.75 |
| E7 @ 1 mm | 0.31 | 0.61 | 0.88 | 1.10 | 1.26 |

Embodiment 1

An optically diffusive plastic comprising: 40 to 94.9 mass % of a polymer resin matrix; 5 to 50 mass % of a glass filler; and 0.1 to 10 mass % of a light diffusing component; wherein the difference between refractive index of the polymer resin matrix and refractive index of the glass filler is less than or equal to 0.02; wherein a 1 mm thick sample of the optically diffusive plastic comprises a DLD value of greater than or equal to 1° as measured by goniophotometry; wherein the 1 mm thick sample comprises a total transmittance of greater than or equal to 40% for incident light having a wavelength of 360 nm to 750 nm in air as determined by ASTM D1003 Procedure A, using CIE standard illuminant D65; and wherein a 3.2 mm thick sample of the optically diffusive plastic comprises a flexural modulus, measured at 23° C., of greater than or equal to 2,500 MPa as determined by ASTM D790.

Embodiment 2

An optically diffusive plastic comprising: 40 to 94.9 mass % of a polymer resin matrix; 5 to 50 mass % of a glass filler; and 0.1 to 10 mass % of a light diffusing component;

wherein the difference between the refractive index of the polymer resin matrix and the refractive index of the glass filler is less than or equal to 0.02, wherein a 1 mm thick sample of the optically diffusive plastic comprises a DLD value of greater than or equal to 1° as measured by goniophotometry, and a total transmittance of greater than or equal to 40% for incident light having a wavelength of 360 nm to 750 nm in air, as determined by ASTM D1003 Procedure A, using CIE standard illuminant D65; and wherein a test sample of the optically diffusive plastic having a thickness of 1 mm, a width of 13.2 mm, and a length of 121 mm, is extended across a span of 60 mm exhibits a deflection of less than or equal to 10 mm when subjected to a load of 1 kgf applied by a load head having a 5 mm diameter and positioned in the center of the sample and center of the span in accordance to ASTM D5023.

Embodiment 3

The plastic of any of the previous embodiments, wherein the deflection is less than or equal to 8 mm.

Embodiment 4

The plastic of any of the previous embodiments, wherein haze of the 1 mm thick sample as determined by ASTM D1003 procedure A, using CIE standard illuminant C is greater than or equal to 95%.

Embodiment 5

The plastic of any of the previous embodiments, wherein the total transmittance is greater than or equal to 50%.

Embodiment 6

The plastic of any of the previous embodiments, wherein the refractive index of the glass filler is from 1.564 to 1.582.

Embodiment 7

The plastic of any of the previous embodiments, wherein the light diffusing component comprises poly(methyl methacrylate), a silicone bead, titanium dioxide, or a combination comprising at least one of the foregoing.

Embodiment 8

The plastic of any of the previous embodiments, wherein the light diffusing component comprises polymethylsilsesquioxane, hydrolyzed poly(alkyl trialkoxysilanes), or both polymethylsilsesquioxane and hydrolyzed poly(alkyl trialkoxysilanes).

Embodiment 9

The plastic of any of the previous embodiments, wherein the polymer resin matrix comprises a polycarbonate, a polyester, a polyester copolymer, a polycarbonate copolymer, poly(methyl methacrylate), polystyrene or a combination comprising at least one of the foregoing.

Embodiment 10

The plastic of any of the previous embodiments, further comprising a mold release agent, a transesterification inhibitor, or a combination comprising at least one of the foregoing.

Embodiment 11

The plastic of any of the previous embodiments, wherein the difference between the refractive index of the polymer resin matrix and the refractive index of the glass filler is less than or equal to 0.01.

Embodiment 12

The plastic of any of the previous embodiments, wherein the difference between the refractive index of the polymer resin matrix and the refractive index of the glass filler is less than or equal to 0.005.

Embodiment 13

The plastic of any of the previous embodiments, wherein the difference between the refractive index of the polymer resin matrix and the refractive index of the glass filler is less than or equal to 0.002.

Embodiment 14

The plastic of any of the previous embodiments, wherein the DLD value is greater than or equal to 10°.

Embodiment 15

The plastic of any of the previous embodiments, wherein the DLD value is greater than or equal to 20°.

Embodiment 16

The plastic of any of the previous embodiments, wherein the DLD value is greater than or equal to 30°.

Embodiment 17

The plastic of any of the previous embodiments, wherein the DLD value is greater than or equal to 50°.

Embodiment 18

The plastic of any of the previous embodiments, wherein the DLD value is greater than or equal to 60°.

Embodiment 19

The plastic of any of the previous embodiments, wherein the total transmittance is greater than or equal to 60%.

Embodiment 20

The plastic of any of the previous embodiments, wherein a 3.2 mm thick sample of the optically diffusive plastic comprises a flexural modulus, measured at 23° C., of greater than or equal to 2,500 MPa as determined by ASTM D790.

Embodiment 21

The plastic of any of the previous embodiments, wherein the flexural modulus is greater than or equal to 3,000 MPa.

Embodiment 22

The plastic of any of the previous embodiments, wherein the flexural modulus is greater than or equal to 4,500 MPa.

Embodiment 23

The plastic of any of the previous embodiments, wherein the flexural modulus is greater than or equal to 5,000 MPa.

Embodiment 24

An optical lens or an optical diffuser comprising the optically diffusive plastic of any of Embodiments 1-23.

Embodiment 25

An illuminating device comprising: a light source; and an optical element comprising the optically diffusive plastic of any of Embodiments 1-23; and wherein the optical lens or the optical diffuser is disposed between the light source and an object to be illuminated.

Embodiment 25

A method of forming an optical element comprising: heating a optically diffusive plastic of any of Embodiments 1-23; introducing the optically diffusive plastic into a cavity of a molding device, wherein the cavity is defined by a die having opposing surfaces, and wherein the cavity has a shape of the optical element; pressing the opposing surfaces of the die together; cooling the cavity to form the optical element.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless otherwise specified herein, any reference to standards, regulations, testing methods and the like (such as ASTM D1003, ASTM D5023, ASTM D790 and ASTM E2387) refer to the most recent standard or method that is in force as of Sep. 10, 2015.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. An optically diffusive plastic comprising:
   40 to 94.9 mass % of a polymer resin matrix;
   5 to 50 mass % of a glass filler; and
   0.1 to 10 mass % of a light diffusing component;
   wherein the difference between refractive index of the polymer resin matrix and refractive index of the glass filler is less than or equal to 0.02;
   wherein a 1 mm thick sample of the optically diffusive plastic comprises DLD value of greater than or equal to 1° as measured by goniophotometry, and a total transmittance of greater than or equal to 40% for incident light having a wavelength of 360 nm to 750 nm in air as determined by ASTM D1003 Procedure A, using CIE standard illuminant D65; and
   at least one of
   wherein a 3.2 mm thick sample of the optically diffusive plastic comprises a flexural modulus, measured at 23° C., of greater than or equal to 2,500 MPa as determined by ASTM D790; and
   wherein a test sample of the optically diffusive plastic having a thickness of 1 mm, a width of 13.2 mm, and a length of 121 mm, is extended across a span of 60 mm exhibits a deflection of less than or equal to 10 mm when subjected to a load of 1 kgf applied by a load head having a 5 mm diameter and positioned in the center of the sample and center of the span in accordance to ASTM D5023.

2. The plastic of claim 1, wherein a 3.2 mm thick sample of the optically diffusive plastic comprises a flexural modulus, measured at 23° C., of greater than or equal to 2,500 MPa as determined by ASTM D790.

3. The plastic of claim 1, wherein the deflection is less than or equal to 8 mm.

4. The plastic of claim 1, wherein haze of the 1 mm thick sample as determined by ASTM D1003 procedure A, using CIE standard illuminant C is greater than or equal to 95%.

5. The plastic claim 1, wherein the total transmittance is greater than or equal to 50% for incident light having a wavelength of 360 nm to 750 nm in air.

6. The plastic of claim 1, wherein the refractive index of the glass filler is 1.564 to 1.582.

7. The plastic claim 1, wherein the light diffusing component comprises poly(methylmethacrylate), a silicone bead, titanium dioxide, or a combination comprising at least one of the foregoing.

8. The plastic of claim 1, wherein the light diffusing component comprises polymethylsilsesquioxane, hydrolyzed poly(alkyl trialkoxysilanes), or both polymethylsilsesquioxane and hydrolyzed poly(alkyl trialkoxysilanes).

9. The plastic of claim 1, wherein the polymer resin matrix comprises a polycarbonate, a polyester, a polyester copolymer, a polycarbonate copolymer, poly(methyl methacrylate), polystyrene or a combination comprising at least one of the foregoing.

10. The plastic of claim 1, wherein the difference between the refractive index of the polymer resin matrix and the refractive index of the glass filler is less than or equal to 0.01.

11. The plastic of claim 1, wherein the DLD value is greater than or equal to 30°.

12. The plastic of claim 1, wherein the DLD value is greater than or equal to 60°.

13. The plastic of claim 1, wherein the total transmittance is greater than or equal to 60%.

14. The plastic of claim 1, wherein the flexural modulus is greater than or equal to 3,000 MPa.

15. The plastic of claim 1, wherein the flexural modulus is greater than or equal to 4,500 MPa.

16. An optical lens or an optical diffuser comprising the optically diffusive plastic of claim 1.

17. The plastic of claim 1, wherein optically diffusive plastic comprises 25 to 50 mass % of the glass filler.

18. The plastic of claim 17, wherein the polymer resin matrix comprises polycarbonate-polysiloxane.

19. An illuminating device comprising:
a light source; and
an optical element comprising an optically diffusive plastic, wherein the optically diffusive plastic comprises
40 to 94.9 mass % of a polymer resin matrix;
5 to 50 mass % of a glass filler; and
0.1 to 10 mass % of a light diffusing component;
wherein the difference between refractive index of the polymer resin matrix and refractive index of the glass filler is less than or equal to 0.02;
wherein a 1 mm thick sample of the optically diffusive plastic comprises DLD value of greater than or equal to 1° as measured by goniophotometry, and a total transmittance of greater than or equal to 40% for incident light having a wavelength of 360 nm to 750 nm in air as determined by ASTM D1003 Procedure A, using CIE standard illuminant D65; and
at least one of
wherein a 3.2 mm thick sample of the optically diffusive plastic comprises a flexural modulus, measured at 23° C., of greater than or equal to 2,500 MPa as determined by ASTM D790; and
wherein a test sample of the optically diffusive plastic having a thickness of 1 mm, a width of 13.2 mm, and a length of 121 mm, is extended across a span of 60 mm exhibits a deflection of less than or equal to 10 mm when subjected to a load of 1 kgf applied by a load head having a 5 mm diameter and positioned in the center of the sample and center of the span in accordance to ASTM D5023; and
wherein the optical lens or the optical diffuser is disposed between the light source and an object to be illuminated.

20. A method of forming an optical element comprising:
heating a optically diffusive, wherein the optically diffusive plastic comprises
40 to 94.9 mass % of a polymer resin matrix;
5 to 50 mass % of a glass filler; and
0.1 to 10 mass % of a light diffusing component;
wherein the difference between refractive index of the polymer resin matrix and refractive index of the glass filler is less than or equal to 0.02;
wherein a 1 mm thick sample of the optically diffusive plastic comprises DLD value of greater than or equal to 1° as measured by goniophotometry, and a total transmittance of greater than or equal to 40% for incident light having a wavelength of 360 nm to 750 nm in air as determined by ASTM D1003 Procedure A, using CIE standard illuminant D65; and
at least one of
wherein a 3.2 mm thick sample of the optically diffusive plastic comprises a flexural modulus, measured at 23° C., of greater than or equal to 2,500 MPa as determined by ASTM D790; and
wherein a test sample of the optically diffusive plastic having a thickness of 1 mm, a width of 13.2 mm, and a length of 121 mm, is extended across a span of 60 mm exhibits a deflection of less than or equal to 10 mm when subjected to a load of 1 kgf applied by a load head having a 5 mm diameter and positioned in the center of the sample and center of the span in accordance to ASTM D5023;
introducing the optically diffusive plastic into a cavity of a molding device, wherein the cavity is defined by a die having opposing surfaces, and wherein the cavity has a shape of the optical element;
pressing the opposing surfaces of the die together; and
cooling the cavity to form the optical element.

* * * * *